(12) United States Patent
Gnatowski et al.

(10) Patent No.: US 7,785,896 B2
(45) Date of Patent: Aug. 31, 2010

(54) METHODS FOR DETERMINING ORGANIC BIOCIDE CONCENTRATION IN A COMPOSITE WOOD PRODUCT

(75) Inventors: Marek J. Gnatowski, Coquitlam (CA); Christine L. Mah, Vancouver (CA); Gareth Paul Merrick, Plymouth, MN (US)

(73) Assignee: Weyerhaeuser Company Limited, Vancouver, BC (CA)

( * ) Notice: Subject to any disclaimer, the term of this patent is extended or adjusted under 35 U.S.C. 154(b) by 0 days.

(21) Appl. No.: 12/271,676

(22) Filed: Nov. 14, 2008

(65) Prior Publication Data

US 2009/0068756 A1 Mar. 12, 2009

Related U.S. Application Data

(62) Division of application No. 11/171,044, filed on Jun. 30, 2005, now abandoned.

(51) Int. Cl.
G01N 21/76 (2006.01)
(52) U.S. Cl. .................. 436/172; 436/164; 523/122
(58) Field of Classification Search ............... 424/641; 439/172
See application file for complete search history.

(56) References Cited

U.S. PATENT DOCUMENTS

| 4,879,083 | A | | 11/1989 | Knudson | |
| 5,929,132 | A | * | 7/1999 | Hani et al. | ............... 523/122 |
| 5,972,266 | A | | 10/1999 | Fookes | |
| 6,030,562 | A | | 2/2000 | Lehtinen | |
| 6,582,732 | B1 | | 6/2003 | Bender | |

2005/0126430 A1 6/2005 Lightner

FOREIGN PATENT DOCUMENTS

WO 03/095217 11/2003

OTHER PUBLICATIONS

Samworth M., "Digital Color Proofing for Flexography, Part II" Flexo, Aug. 1995.
Demetrician B., "Embracing New Technology in Postprint," Paperboard Packaging, Sep. 1997.
High-end proofing for the flexo and packaging markets, GMG GmbH & Co KG, Germany 2004.
Warren, Peter, "Industrial and Environmental Applications of X-ray Florescence Spectrometry," Analytical Proceedings, vol. 27, Jul. 1990, p. 186-187.
McRoy, Woods, "ICC Evaluation Service, Inc., Rules of Procedure for the Evaluation Committee" and "Proposed McRoy, Revisions to the Acceptance Criteria for Zin Borate Preservative Treatment of Structural Composite Lumber by Non-pressure Processes," Dec. 22, 2005.

* cited by examiner

Primary Examiner—Yelena G Gakh
Assistant Examiner—David Weisz
(74) Attorney, Agent, or Firm—Rachael Vaughn

(57) ABSTRACT

A composite wood product and methods for manufacturing the same and determining the concentration and distribution of an organic biocide within a composite wood product are provided. The organic biocide may be added to wood elements (i.e., fibers, flakes, strands, veneers) prior to consolidation and/or heating of the wood particles to form the composite wood product. A tracer additive may be mixed with the biocide, or applied separately to the furnish which is used to produce the composite wood product. The tracer additive may be detected via, for example, x-ray fluorescence. An amount of tracer additive detected may correlate to an amount of organic biocide within the wood elements and/or the composite wood product.

9 Claims, 1 Drawing Sheet

METHODS FOR DETERMINING ORGANIC BIOCIDE CONCENTRATION IN A COMPOSITE WOOD PRODUCT

CROSS-REFERENCE TO RELATED APPLICATION

This application is a divisional application of U.S. patent application Ser. No. 11/171,044, filed Jun. 30, 2005.

FIELD OF THE INVENTION

This invention relates generally to a composite wood product and methods for manufacturing composite wood products and determining a concentration of an organic biocide within a composite wood product. A tracer element may be added to the organic biocide prior to composite wood product formation. The tracer element may be detected via, for example, x-ray fluorescence spectroscopy. The amount of tracer element detected can be correlated to the amount of organic biocide within the composite wood product.

BACKGROUND

Composite wood products are made from elements or particles of wood, commonly called furnish, which are consolidated and bonded together with adhesive resin(s). It should be understood that, in the present application, the terms "element", "particle" and "furnish" may be used interchangeably and may refer to any type of element from which a composite wood product may be manufactured. It should further be understood that wood composites, as defined in this specification, refer to those products which maintain the main properties of wood. Wood elements may include, for example, wood flour, fiber, fiber bundles, flakes, chips, wafers, strands, veneers, or combinations of the like. Different grades and/or types of composite wood products can be manufactured depending on, for example, the wood species, size of the wood elements, and processing conditions. The elements are dried to the moisture content level required by the process. Then adhesive, biocides, and other types of additives such as, for example, waxes, are applied to the furnish. This process may occur at one of many stages of manufacture, but commonly would occur during a process referred to as blending. Usually the blended furnish is then formed into a mat, which is then consolidated under heat and pressure to form the final composite wood product.

Certain biocides can be applied to the furnish to impart decay and/or insect resistance in the final product. Biocides typically used in industrial applications include, for example, inorganic compounds, such as zinc borate, sodium borate, or copper-containing salts. Many types of inorganic compounds may be used as single preservatives, or may be used in combination with other compounds as co-biocides to treat wood fragments prior to formation of a composite wood product.

Controlling biocide additive content may be critical to ensure proper concentration and distribution of active ingredients in the product. Uniform biocide distribution across the product enables economical and proper product protection against insects and fungi, including decay. Non-uniform concentration or distribution may lead to partial damage of the product by fungi or insects. Uniformity of biocide distribution depends on the method of application. During application, a variety of accidental factors may appear which may result in non-uniform distribution of biocides or application of biocides in quantities outside the target range. Examples of some problems include clogging of a spray nozzle with dust, contamination in biocide dispersion, a faulty dispensing system, etc. In a production setting, such as a commercial setting, it is difficult to quantify uniformity of treatment simply from the appearance of the blended wood furnish or in the final composite wood product. As a result, special analytical methods must be applied to the product to identify active ingredient concentration and distribution.

It has been found that wood preservatives containing certain elements, for example, chlorine, zinc and/or copper and/or chromium and/or arsenic, could be analyzed relatively quickly without special sample preparation via x-ray fluorescence spectroscopy ("XRF"). This was particularly the case if such elements were introduced into the wood product in sufficient concentration (above 1000 ppm, but in some cases as low as 30 ppm). XRF analysis allows for the non-destructive analysis of a wide range of elements, typically those heavier than Fluorine (F). The basic principle behind XRF spectroscopy is the use of an energy source to excite an inner shell electron of an atom. Energy is applied from a source, for example an appropriate radioisotope, under which the atom will emit an x-ray photon (fluoresce). If the applied energy is of sufficient strength, an electron will be ejected from an inner ring. This electron will be replaced by an electron from an outer ring in order to stabilize the atom. The movement of an electron to stabilize the atom will emit an x-ray photon, which is counted by the detector.

It was also found that preservatives containing organic compounds such as deltamethrin, chlorpyrifos or isothiazolone require a target application level onto a wood product often as low as 10 ppm to 2000 ppm. However, elements sensitive to XRF analysis are not present or present in less than sufficient concentrations to enable quick and accurate analysis of these products. Products treated with organic biocides require complex sample preparation and sophisticated analytical methods, such as, for example, High Performance Liquid Chromatography (HPLC), Gas Chromatography (GC), or Neutron Activation Analysis (NAA). Even in isolated cases where sample preparation is not a major issue, these methods require specialized and expensive equipment, as well as trained personnel. Neither is readily available or practical in a composite wood manufacturing facility. The delay associated with such sophisticated analytical methods can be a major problem because it potentially allows faulty product to be manufactured without timely detection of defects. A need, therefore, exists for a method of determining a concentration and distribution of a biocide within a composite wood product which is more convenient than known methods.

SUMMARY

The present invention generally relates to wood composite manufacture and methods for indirectly quantifying the concentration and distribution of an organic biocide within a composite wood product. A tracer element, or additive, may be added to the biocide. The resultant mixture may be applied to wood elements prior to composite wood product formation. The tracer element may be detected via, for example, x-ray fluorescence spectroscopy. An amount of tracer element detected can be correlated to the amount of organic biocide within the composite wood product.

It was found that in composite wood products, organic biocides frequently cannot be detected in target application quantities in extracts prepared from the final composite products using known reliable wet chemistry methods. This may likely be a result, for example, of partial decomposition and/or fixation in the glue line. Adhesive resins used in wood composites, such as, for example, phenolics, p-MDI, melamine or urea which become highly crosslinked, may be a significant factor in an active's fixation. Such depletion of organic biocides may be directly related to the product formation, type of adhesive used and/or process conditions. However, according to the present invention, it has been found, unexpectedly, that the relationship between the assayed and target concentrations of tracer elements in composite and the initial target concentration of additives of interest may be connected through coefficients of retention, as will be described later in more detail. This coefficient can be experimentally assessed and calculated. Coefficient of retention is related to target and assay concentrations of active ingredients and tracers as identified by analytical methods in a composite wood product sample. Unexpected losses of active ingredients during handling and/or the manufacturing process become visible from the unusually low level of tracer element detected in the product, and knowledge of the coefficient of retention allows calculation of the actual concentration of actives. The constant value of a coefficient of retention within a relatively wide range of concentration of additive of interest as discovered makes the analysis described above relatively accurate.

The present invention may provide solutions and/or dispersions carrying organic biocides which may be formulated with one or more tracer elements that are suitable for XRF analysis. The quantities may be those required for fast and/or accurate detection and may enable analysis of concentration and/or distribution of active ingredient in the composite wood product. To obtain uniform distribution at the ppm level, in an embodiment, biocides may be applied to wood fragments in the form of diluted solutions or dispersions, in concentrations of 0.001 to 10%. These concentrations may vary depending on the type of composite wood product, solution and/or dispersion design and/or other conditions of manufacture.

The tracer or additive may be mixed with the biocide prior to application to the wood furnish elements. The tracers implemented within the solutions and/or dispersions may be, for example, part of a synergistic biocide formulation. An example of such a tracer may be, for example, zinc in zinc borate. It was found that biocides containing metal or other elements sensitive to XRF analysis, such as, for example, zinc borate, could be prepared in a blend of powders, or in a dispersion in a common liquid carrier, such as water, which may also carry one or more biocides. The use of a liquid dispersion of biocides has several advantages, such as, for example, lack of dust during handling; more uniform distribution; and reduction of losses (dislocation) during the pressing process, particularly when steam injection is used. In some embodiments, an additional advantage may be that the formulation has a synergistic effect. For example, a combination of biocides may be applied to the wood elements and may be monitored via one or more tracer elements. The combination may be more effective in protection of composite wood products against insects or decay in comparison to individual biocides.

Powder blends or liquid dispersions of the present invention may be sprayed or applied onto wood elements before entering the blender, or once inside the blender prior to consolidation into the composite wood product. It may be possible to apply tracer and organic biocide separately into the blender using a connected system of multiple feeders with one feeder dedicated to tracer distribution and other(s) to additive(s) of interest.

A first type of analysis may be performed on completed composite wood product samples. The products may be broken down and assayed for the presence and distribution of active ingredients using the XRF technique. A second type of analysis may be conducted via installation of detection devices on or proximate to a manufacturing line, prior to compression and/or heating of the elements to form the composite wood product. The XRF technique may be applied for continuous monitoring of preservative distribution on the production line. It could be performed before or after the pressing operation. Stable preservatives containing metal, or other XRF sensitive elements, may be directly detected by XRF analysis. Concentration and distribution in wood composites of organic co-biocides incapable of being directly detected, can be assessed indirectly based on XRF analysis data with respect to the tracer concentration. This can be achieved due to the coefficient of retention and relationship between tracer assay and target values, as well as the known target concentration of an additive of interest. Assessment and calculation for the coefficient of retention may be established in independent experiments prior to commercial testing.

The coefficient of organic biocide retention "K" can be calculated from the following equation (1):

$$K = (A_2 \times Z_1)/(A_1 \times Z_2) \qquad (1)$$

Where:
$A_1$=target concentration of biocide of interest in wood product
$A_2$=assayed concentration of biocide of interest in wood product
$Z_1$=target concentration of tracer element as applied to composite wood product
$Z_2$=assayed concentration of tracer element in wood product The data required for calculation of this coefficient may be collected from independent samples of formed composite wood products. The number of samples evaluated for this purpose may depend on the required accuracy of analysis for treated product, and the variability of the analytical method used. Accordingly, when analytical data for the calculation of coefficient of retention K is more consistent, fewer samples may require evaluation for calculation of coefficient of retention. The calculated average from this experiment may be used in assessment of biocide concentration in samples of interest.

Based on the above-mentioned coefficient of retention, the concentration of the biocide of interest in the sample can be calculated from equation 2 or from a specially prepared calibration curve:

$$A_x = (K \times Z_{2x} \times A_{1x})/Z_{1x} \qquad (2)$$

Where:
$A_{1x}$=target concentration of biocide of interest in wood product
$Z_{1x}$=target concentration of tracer element in sample
$Z_{2x}$=assay of tracer element
$K$=coefficient of retention (as described in equation 1)

It is, therefore, an advantage of the present invention to provide a method for determining a concentration of an organic biocide within a composite wood product wherein the method is more convenient and/or accurate than known methods for determining organic biocide concentrations.

Additional features and advantages of the present invention are described in, and will be apparent from, the detailed description of the present embodiments and from the drawings.

DESCRIPTION OF THE DRAWINGS

The embodiments of the present invention are described in detail below with reference to the following drawing.

DETAILED DESCRIPTION

Figure 1:
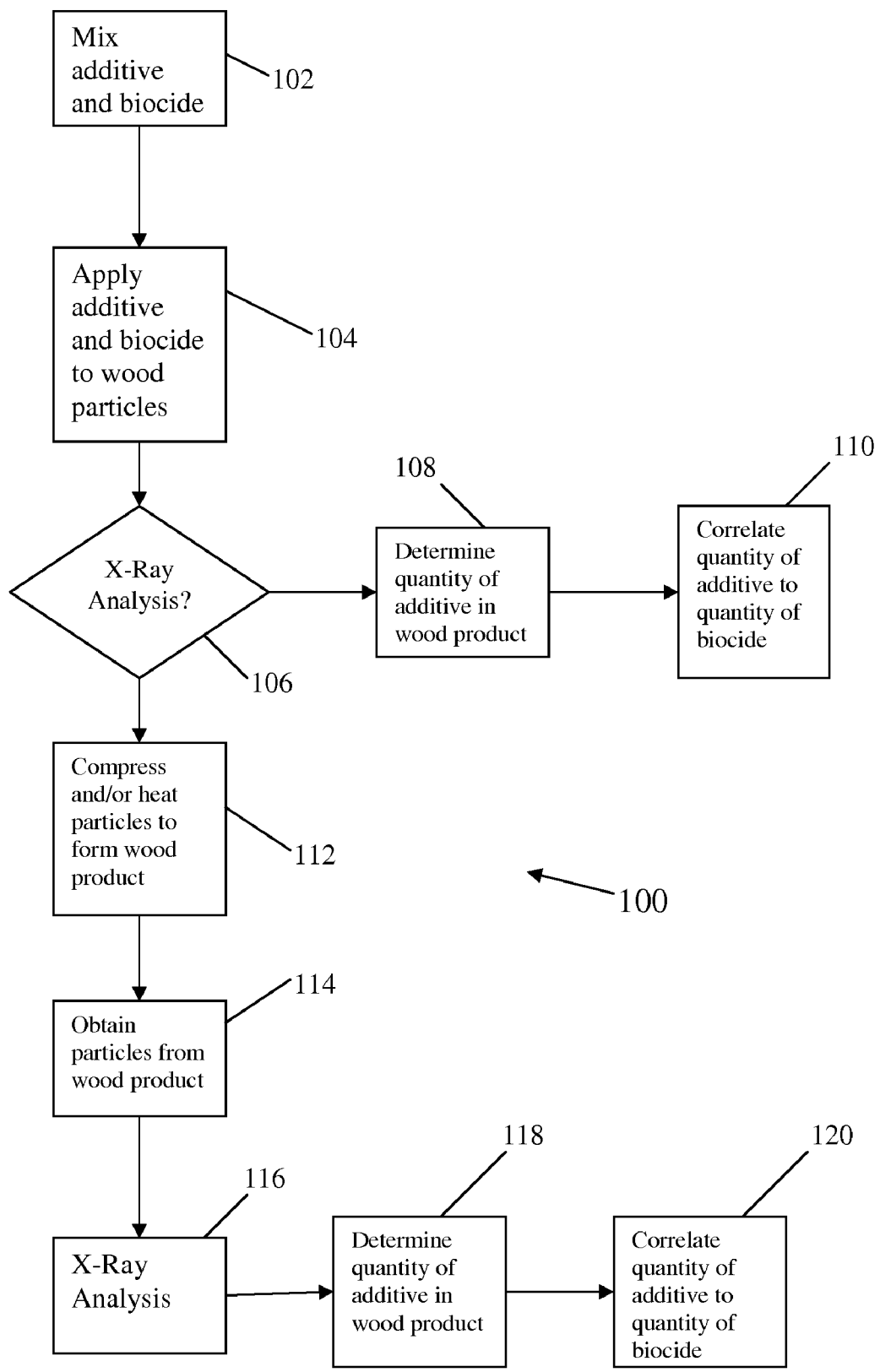
FIG. 1 is a flowchart of a method of determining a concentration of a biocide in an embodiment of the present invention.

The present invention relates to composite wood product manufacture and methods for determining a concentration of an organic biocide within a composite wood product. A tracer element may be added to the organic biocide prior to composite wood product formation. In this regard, the organic biocide and tracer may be added to wood elements (e.g., fibers, fiber bundles, flakes, strands, veneers) prior to consolidation of the composite wood product. It should be understood that use of the words "element", "fragment" or "particle" references any type of wood furnish from which a composite wood product is manufactured. It should be further understood that the term "composite wood product" may refer to any type of engineered wood product, such as, for example, medium density fiberboard (MDF), particleboard, oriented strand board (OSB), waferboard, laminated strand lumber (LSL), plywood, laminated veneer lumber (LVL), parallel strand lumber (PSL), crushed long-fiber lumber (scrimber) or combinations of the like. The tracer element may be detected via, for example, x-ray fluorescence spectroscopy. An amount of tracer element detected may correlate to an amount of organic biocide within the composite wood product.

The organic biocide may be, for example, a synthetic pyrethroid (e.g. permethrin, deltamethrin or bifenthrin), a triazole (e.g. tebuconazole, propiconazole), a nicotinoid (e.g. imidacloprid), a fiprole (e.g. fipronil) or the like. The additive may contain, for example, zinc, copper, nickel, cobalt, or any other element which may be detected via x-ray fluorescence and has an atomic weight greater than or equal to 10. FIG. 1 illustrates a flowchart of a method 100 for determining a biocide concentration within a composite wood product in an embodiment of the present invention. In a first step, 102, the organic biocide and additive, or tracer element, may be mixed together. This mixture may occur in, for example, a powder blend, dispersion, or other medium suitable for application onto the wood particles comprising the furnish. In other embodiments, the biocide and additive may be applied separately to the furnish, such as from differing streams in a blender system connected to, for example, a common metering system. In a next step 104, the biocide and the additive may be applied to wood furnish prior to consolidation under heat and pressure.

Decision 106 represents a differentiation between two embodiments. Namely, in a first embodiment, the wood elements comprising the furnish are examined on, for example, a forming or assembly line, prior to compression and/or heating to form the composite wood product. In a second embodiment; analysis occurs after formation of the composite wood product. If the elements are to be examined on the forming line, an x-ray fluorescence system may be placed adjacent to the elements within the overall system for manufacturing an engineered composite wood product. An example of a suitable x-ray fluorescence equipment may be, for example, obtained from ASOMA® Instruments, Inc. The x-ray system may determine a quantity of additive in the wood product, as shown at step 108. Based on this determination, a concentration and distribution of biocide in the composite wood sample may also be calculated, as shown at step 110, using the equations previously outlined.

In an alternate embodiment, the elements comprising the furnish may be compressed and heated, as shown at step 112, after the biocide and additive mixture is applied. Sufficient time may be allocated prior to obtaining the composite wood product sample, as shown at step 114. The sample removed from the composite wood product may be, for example, ground for testing and may then be subject to x-ray fluorescence as shown at step 116. In another embodiment, a core portion of the composite wood product may be obtained for testing. It is assumed that previous testing of samples was conducted to determine a value for the coefficient of organic biocide retention "K" in accordance with Equation 1 mentioned above. The tracer concentration may be obtained as shown at step 118. Knowing the target concentration of the biocide of interest, target concentration of tracer element, coefficient K and assay of a tracer, the concentration of the biocide of interest in the sample can be calculated from equation 2 as outlined above or identified from the corresponding calibration curve. This step is illustrated at 120.

The invention and procedure of analysis may be described in the following examples:

Example 1

11.5 g of NATROSOL® 250 HB thickener, TAMOL® 681 (Rohm & Haas) dispersing aid and 11.5 g of BYK® 031 (BYK Chemie) defoamer were mixed with 768 g of water using a high speed disperser. After dissolving the thickener, 2303 g of zinc borate (BOROGARD® ZB—US Borax) was added along with an additional 576 g of water and 11.5 g of IGEPAL® Co 630 surfactant. When the dispersion became homogenous (with a Hegman grind of 6-7 as per ASTM D1210), an additional 192 g of water was added, along with 46 g of TIMBOR® (US Borax), 46 g of Versene (Dow Chemical), 156.7 g of DURSBAN® R (organic insecticide—Dow Agro) and 746 g of wax emulsion. Mixing was completed until a uniform dispersion was obtained. Product was coded as a Preservative ZBDB.

Example 2

2.8 g of KELZAN® (Xanthan gum—Kelco), 2.8 g of VAN GEL B® (Vanderbilt), 3.8 g of TAMOL® 681 (Rohm & Haas) dispersing aid and 3.8 g of BYK® 031 (BYK Chemie) defoamer were mixed with 509 g of water using a high speed disperser. To the homogenous mixture, 1526 g of zinc borate (BOROGARD® ZB—US Borax) was added, together with 371 g of water and 7.6 g IGEPAL® Co 630. When the dispersion became homogenous, (a Hegman grind 6-7 as per ASTM D1210), an additional 7.5 g of water was added, together with TROYSAN® 174 (Troy) (10% in water). This was followed by TIMBERTREAT® DM-5 (Kop-Coat) in quantities shown in Table 1. Products were coded as a Preservatives ZBDM-1, ZBDM-3, and ZBDM-4.

TABLE 1

Quantities of Timbertreat and additional water used in formulation

| Formulations | Timbertreat DM-5 (g) | Water (g) |
|---|---|---|
| ZBDM-1 | 50 | 280 |
| ZBDM-3 | 165 | 165 |
| ZBDM-4 | 330 | 0 |

Example 3

3.20 g KELZAN® (Xanthan gum—Kelco), 7.38 g of TAMOL® 681 (Rohm & Haas) dispersing aid and 3.70 g of BYK® 031 (BYK Chemie) defoamer were mixed with 492 g of water using a high speed disperser. To the homogenous mixture, 1477 g of zinc borate (BOROGARD® ZB—US Borax) was added together with an additional 281 g of water and 7.36 g IGEPAL® Co 630. When the dispersion became homogenous, (approximately 6-7 a Hegman grind as per ASTM D1210), 9.8 g TROYSAN® 173 (Troy) (10% in water) in can preservative was incorporated into the mixture, together with 239 g of wax emulsion. An additional 97.5 g of TIMBERTREAT® DM-5 (Kop-Coat) was then added, and after thorough incorporation of active into the dispersion, the process was completed. The product was coded as a Preservative ZBDM-6.

Example 4

120 lb. of dry aspen strands were loaded into a blender and sprayed with MDI adhesive for a period of 10 minutes. Resin content on the strands was targeted at about 5%. This was followed by spraying of slack wax into the blender as well as addition of the required quantity of dispersion containing preservative made as described in examples 1, 2, and 3. Quantities of materials used are shown in Table 2. Three 2'×2' composite wood panels were made separately from each blender load using a steam injection press according to standard industry procedure.

TABLE 2

| Components | Trial 1 lb. | Trial 2 lb. | Trial 3 lb. | Trial 4 lb. | Trial 5 lb. |
| --- | --- | --- | --- | --- | --- |
| Wood Strands | 200 | 110 | 110 | 110 | 120 |
| MDI Adhesive | 10 | 5.8 | 5.8 | 5.8 | 6 |
| Preservative | | | | | |
| ZBDB | 6.6 | — | — | — | — |
| ZBDM-1 | — | 2.9 | — | — | — |
| ZBDM-3 | — | — | 2.9 | — | — |
| ZBDM-4 | — | — | — | 2.8 | — |
| ZBDM-6 | — | — | — | — | 2.6 |
| Slack Wax | 1.0 | 0.58 | 0.58 | 0.58 | 0.6 |

Example 5

Five 2"×2" specimens randomly selected from two out of three boards made as described in Example 4 were used. The specimens were ground and assayed for zinc and organic biocide. Samples of products were ground to approximately 30 mesh size and analyzed for zinc using a procedure described in the American Wood Preservative Association Standard A9-01 (XRF method). Organic biocides were analyzed by extraction from the independent samples. Samples of ground wood approximately 4 g in weight were Soxhlet extracted for 6 hours in cellulose thimblets using acetone with 2% water. Extract was quantitatively transferred to 250 ml volumetric flasks. 200 µl water was added to 800 µl extract. The sample was mixed, then filtrated through a 0.45µ filter prior to HPLC analysis.

HPLC analysis was performed using a Hewlett-Packard HP 1100 HPLC implementing a diode assay detector. UV signal at 230 nm was used to calculate the reposted results. The analytical column used was a Zorbax XDB-8 C8, 5 cm×4.6 mm id×3µ particle size. Flow rate was 0.75 ml/min.

The results obtained from the analysis, and calculated coefficients of retention of organic biocide, including the average K for trial 1 and the combined average K for trials 2, 3, and 4, are shown in Table 3.

TABLE 3

Calculation of coefficient of retention for organic biocides used in treatment of wood products

| | | Target | | Assay | | Coefficient of Retention (K) |
| --- | --- | --- | --- | --- | --- | --- |
| Trial # | Sample ID | Zinc ($Z_1$) ppm | Organic Biocide ($A_1$) ppm | Zinc Content ($Z_2$) ppm | Organic Biocide ($A_2$) ppm | |
| 1 | 4.2 1158 | 6000 | 1000 | 3630 | 388 | .64 |
| 1 | 2.5 1158 | 6000 | 1000 | 3465 | 375 | .65 |
| 1 | 2.3 1158 | 6000 | 1000 | 3660 | 359 | .59 |
| 1 | 6.10 1159 | 6000 | 1000 | 4120 | 365 | .53 |
| 1 | 8.7 1159 | 6000 | 1000 | 3810 | 375 | .59 |
| Average for trial 1 | | | | | | .60 |
| 2 | 3.7 1218 | 4551 | 11 | 3388 | 3.9 | .48 |
| 2 | 8.7 1218 | 4551 | 11 | 3388 | 4.8 | .59 |
| 2 | 1.1 1219 | 4551 | 11 | 3426 | 4.2 | .51 |
| 2 | 6.1 1219 | 4551 | 11 | 3388 | 3.6 | .44 |
| 3 | 6.1 1227 | 4698 | 38.1 | 3426 | 10.2 | .37 |
| 3 | 10.1 1227 | 4698 | 38.1 | 3349 | 14.5 | .53 |
| 3 | 3.7 1228 | 4698 | 38.1 | 3542 | 19.3 | .67 |
| 3 | 8.7 1227 | 4698 | 38.1 | 3080 | 12.3 | .49 |
| 4 | 1.1 1230 | 4385 | 73.1 | 3773 | 29.5 | .47 |
| 4 | 10.1 1230 | 4385 | 73.1 | 3175 | 22.6 | .43 |
| 4 | 6.1 1230 | 4385 | 73.1 | 3811 | 31.5 | .50 |
| 4 | 8.7 1230 | 4385 | 73.1 | 3580 | 30.1 | .50 |
| 4 | 6.1 1231 | 4385 | 73.1 | 2965 | 26.3 | .53 |
| Average for trials 2, 3, 4 | | | | | | .50 |

Example 6

The one remaining panel of the three manufactured from each furnish formulation as described in Example 4, (and not tested earlier for coefficient of retention of organic biocides as described in Example 5), was used. The panels were cut into 2"×2" samples. Two samples from each panel were analyzed for zinc content using XRF method and the procedure described in Example 5. Based on these results, and the formula presented earlier, the concentration of organic biocide was calculated using equation 2. The results are shown in Table 4.

TABLE 4

The concentration in wood products of organic biocides calculated based on zinc traces assay

| | | Target | | Assay | | |
|---|---|---|---|---|---|---|
| | | | | | Organic Biocide | |
| Trial # | Sample ID | Zinc ($Z_{1x}$) ppm | Organic Biocide ($A_{1x}$) ppm | Zinc Assayed ($Z_{2x}$) ppm | Concentration Calculated ($A_x$) ppm | Organic Biocide Concentration Assayed* ppm |
| 1 | 6.4 1160 | 6000 | 1000 | 3965 | 396 | 418 |
|   | 6.5 1160 | 6000 | 1000 | 3965 | 396 | 408 |
| 2 | 1.1 1220 | 4551 | 11 | 3426 | 4.1 | 5.5 |
|   | 8.7 1220 | 4551 | 11 | 3580 | 4.3 | 4.4 |
| 3 | 6.1 1229 | 4698 | 38.1 | 3503 | 14.2 | 10.6 |
|   | 10.1 1229 | 4698 | 38.1 | 3157 | 12.8 | 10.1 |
| 4 | 6.1 1232 | 4385 | 73.1 | 3349 | 27.9 | 30.3 |
|   | 10.1 1232 | 4385 | 73.1 | 3349 | 27.9 | 26.0 |
| 5 | 13 1539 | 4379 | 38.6 | 3619 | 15.9 | 14.7 |
|   | 12 1543 | 4379 | 38.6 | 3426 | 15.1 | 16.7 |

*Comparison data obtained from analysis of samples by extraction and HPLC technique.

After this evaluation, the remains of samples tested for zinc borate were assayed for organic biocides using HPLC method as described in Example 5. The results were compared with those calculated in the last column of Table 4. The data evidences reasonable accuracy with respect to calculation of concentration of organic biocides based on one or more assays of zinc traces and a determination of a coefficient of retention via experimentation. This also allows for qualification of distribution of biocide within the composite wood product. Data presented in Table 3 also shows constant value of coefficient of retention, within experimental error, for tested biocides within the wide range of concentrations used. Small values (K<1) for coefficients of retentions indicated a significant difference between target and assayed concentrations of organic biocides observed during the making of wood composites.

While the embodiments of the invention have been illustrated and described, as noted above, many changes can be made without departing from the spirit and scope of the invention. Accordingly, the scope of the invention is not limited by the disclosure of the embodiments. Instead, the invention should be determined entirely by reference to the claims that follow.

The embodiments of the invention in which an exclusive property and privilege is claimed are defined as follows:

1. A method for qualifying the distribution of an organic biocide within a composite wood product, the method comprising the steps of:
    providing the plurality of wood particles;
    applying a fluorescent tracer to an organic biocide;
    applying the organic biocide with the tracer to the plurality of wood particles;
    compressing the plurality of wood particles to form a composite wood product;
    subjecting the organic biocide and tracer treated composite wood product to an x-ray fluorescence analysis;
    determining concentration of the additive detected within the composite wood product; and
    determining concentration of the organic biocide within the composite wood product based on a correlation between the concentration of the additive detected and the concentration of the organic biocide within the composite wood product;
    wherein the correlation between the concentration of the tracer detected and the concentration of the organic biocide within the composite wood product is expressed by a coefficient of organic biocide retention K, wherein:

$$K=(A_2*Z_1)/(A_1*Z_2)$$

wherein $A_1$ represents a target concentration of the organic biocide in one or more samples; wherein $A_2$ represents an assayed concentration of organic biocide in the one or more samples; wherein $Z_1$ represents a target concentration of the tracer element in the one or more samples; and wherein $Z_2$ represents an assayed concentration of the tracer element in the one or more samples; and wherein K is approximately 0.50.

2. The method of claim 1 wherein the additive contains an element having an atomic weight greater than or equal to ten.

3. The method of claim 1 wherein the organic biocide is selected from a group consisting of a synthetic pyrethroid, a triazole, a nicotinoid and a fiprole.

4. The method of claim 1 wherein the particles are selected from a group consisting of: flour, fibers, fiber bundles, flakes, chips, wafers, veneers and strands.

5. The method of claim 1 wherein the tracer is selected from the group consisting of zinc, barium, and calcium.

6. The method of claim 1 wherein the step of determining concentration of the organic biocide within the composite wood product is performed by calculating concentration of organic biocide $A_x$ wherein:

$$A_x=K*Z_{2x}*A_{1x}/Z_{1x}$$

wherein $A_{1x}$ is a target concentration of organic biocide in the composite wood product; wherein $Z_{1x}$ is a target concentration of the tracer element within the composite wood product; and wherein $Z_{2x}$ is an assay of the tracer element within the composite wood product.

7. A method for qualifying the distribution of an organic biocide within a composite wood product, the method comprising the steps of:
    applying a fluorescent tracer to an organic biocide;
    applying the biocide and tracer to a plurality of wood particles;
    compressing the plurality of wood particles to form a composite wood product;

subjecting the composite wood product to x-ray fluorescence analysis;
determining concentration of the tracer element detected within the composite wood product; and
calculating concentration of the biocide within the composite wood product based on a correlation between the concentration of the tracer element detected and the concentration of the biocide within the composite wood product;
wherein the correlation between the concentration of the tracer detected and the concentration of the organic biocide within the composite wood product is expressed by a coefficient of organic biocide retention K, wherein:

$$K=(A_2*Z_1)/(A_1*Z_2)$$

wherein $A_1$ represents a tar et concentration of the organic biocide in one or more samples; wherein $A_2$ represents an assayed concentration of organic biocide in the one or more samples; wherein $Z_1$ represents a tar et concentration of the tracer element in the one or more samples; and wherein $Z_2$ represents an assayed concentration of the tracer element in the one or more samples.

8. The method of claim 7 wherein the biocide is selected from a group consisting of a synthetic pyrethroid, a triazole, a nicotinoid and a fiprole.

9. The method of claim 7 wherein the step of determining concentration of biocides within the composite wood product is performed calculating concentration of biocide $A_x$ wherein:

$$A_x=K*Z_{2x}*A_{1x}/Z_{1x}$$

wherein $A_{1x}$ is a target concentration of organic biocide in the composite wood product; wherein $Z_{1x}$ is a target concentration of the tracer element within the composite wood product; and wherein $Z_{2x}$ is an assay of the tracer element within the composite wood product.

* * * * *

UNITED STATES PATENT AND TRADEMARK OFFICE
CERTIFICATE OF CORRECTION

PATENT NO. : 7,785,896 B2
APPLICATION NO. : 12/271676
DATED : August 31, 2010
INVENTOR(S) : Marek J. Gnatowski, Christine L. Mah and Gareth Paul Merrick It is certified that error appears in the above-identified patent and that said Letters Patent is hereby corrected as shown below:

Col. 11, line 17 should read as follows::

... wherein $A_1$ represents a target concentration of the organic ...

The word "target" is missing the letter "g".

Col. 12, line 17 should read as follows::

... more samples; wherein $Z_1$ represents a target concentra- ...

The word "target" is missing the letter "g".

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,785,896 B2 |
| APPLICATION NO. | : 12/271676 |
| DATED | : August 31, 2010 |
| INVENTOR(S) | : Marek J. Gnatowski, Christine L. Mah and Gareth Paul Merrick |

It is certified that error appears in the above-identified patent and that said Letters Patent is hereby corrected as shown below:

Col. 9, Line 61, should read as follows:

... determining concentration of the tracer detected within ...

The word "tracer" should replace the word "additive."

Col. 9, Line 65, should read as follows::

... between the concentration of the tracer detected and ...

The word "tracer" should replace the word "additive."

Col. 10, Line 34, should read as follows:

... tion of the tracer in the one or more samples; and ...

The word "element" should be deleted.

Col. 10, Line 37, should read as follows:

... tracer in the one or more samples; and wherein ...

The word "element" should be deleted.

Signed and Sealed this
Fifth Day of April, 2011

David J. Kappos
*Director of the United States Patent and Trademark Office*